United States Patent
Godfroid et al.

(10) Patent No.: US 10,159,272 B2
(45) Date of Patent: *Dec. 25, 2018

(54) COOKING SNACK FOODS

(71) Applicant: Frito-Lay North America, Inc., Plano, TX (US)

(72) Inventors: Robert Godfroid, McKinney, TX (US); Austin Jon Kozman, Dallas, TX (US); Simon John Lawton, Leicestershire (GB); Leon Levine, Albuquerque, NM (US); Roshni Modhwadia, Leicester (GB); David James Stanley-Smith, Derbyshire (GB)

(73) Assignee: Frito-Lay North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/423,057

(22) Filed: Feb. 2, 2017

(65) Prior Publication Data

US 2018/0213828 A1    Aug. 2, 2018

(51) Int. Cl.
*A23L 5/10*   (2016.01)
*F26B 3/22*   (2006.01)
(Continued)

(52) U.S. Cl.
CPC ............... *A23L 5/19* (2016.08); *A23B 7/005* (2013.01); *A23L 3/165* (2013.01); *A23L 7/117* (2016.08);
(Continued)

(58) Field of Classification Search
CPC ... A23L 3/00; A23L 3/005; A23L 3/01; A23L 3/16; A23L 3/165; A23L 3/18;
(Continued)

(56) References Cited

U.S. PATENT DOCUMENTS 1,403,211 A    1/1922 Tribes
1,616,944 A    2/1927 Aoki
(Continued)

FOREIGN PATENT DOCUMENTS

EP    1774857 A    4/2007
FR    2372614 A1    6/1978
(Continued)

OTHER PUBLICATIONS

GB Exam Report for GB1708324.7 dated Jul. 31, 2017 (8 pages).
(Continued)

*Primary Examiner* — Drew E Becker
*Assistant Examiner* — Bryan Kim
(74) *Attorney, Agent, or Firm* — Colin P. Cahoon; Shaukat A. Karjeker; Carstens & Cahoon, LLP (57) ABSTRACT

A method of cooking a snack food, the method comprising the steps of: a. providing a bed comprising a plurality of particles, wherein the particles are composed of, comprise or consist of a material which is magnetic and/or electroconductive; b. heating the particles in the bed to form a cooking medium in the form of a heated bed of particles, wherein in step b the particles are heated at least partially by electromagnetic induction; c. providing a plurality of snack food precursor elements in the cooking medium thereby to cook the elements to form a plurality of cooked snack food pieces, wherein the heated particles transfer heat into the elements by thermal conduction; and d. separating the plurality of snack food pieces and the cooking medium.

23 Claims, 1 Drawing Sheet

(51) Int. Cl.
| | |
|---|---|
| *A23L 7/117* | (2016.01) |
| *A23L 19/18* | (2016.01) |
| *A23L 7/183* | (2016.01) |
| *A23L 3/16* | (2006.01) |
| *A23B 7/005* | (2006.01) |
| *A23L 7/10* | (2016.01) |
| *A23L 7/161* | (2016.01) |
| *A23L 7/174* | (2016.01) |
| *A23L 19/00* | (2016.01) |
| *A23L 19/12* | (2016.01) |

(52) U.S. Cl.
CPC .............. *A23L 7/161* (2016.08); *A23L 7/174* (2016.08); *A23L 7/183* (2016.08); *A23L 7/1975* (2016.08); *A23L 19/00* (2016.08); *A23L 19/09* (2016.08); *A23L 19/12* (2016.08); *A23L 19/18* (2016.08); *F26B 3/225* (2013.01); *A23V 2002/00* (2013.01)

(58) Field of Classification Search
CPC ... A23L 3/185; A23L 5/00; A23L 5/15; A23L 5/34; A23L 5/36; A23L 7/117; A23L 7/135; A23L 7/139; A23L 7/143; A23L 7/161; A23L 7/165; A23L 7/174; A23L 7/183; A23L 7/197; A23L 7/1975; A23L 19/12; A23L 19/15; A23L 19/18; A23L 5/19; A23L 7/126; A23L 19/00; A23L 19/09; F26B 3/20; F26B 3/205; F26B 3/22; F26B 3/225; F26B 3/088; F26B 3/24
USPC ...................................... 165/104.15, 104, 16
See application file for complete search history.

(56) References Cited

U.S. PATENT DOCUMENTS

| | | | | | |
|---|---|---|---|---|---|
| 3,253,344 | A | * | 5/1966 | Van Gelder | F26B 3/205 219/618 |
| 3,253,533 | A | * | 5/1966 | Benson | A23L 3/185 99/323.4 |
| 3,444,996 | A | * | 5/1969 | Walsh | B03B 4/02 209/44 |
| 3,555,992 | A | * | 1/1971 | Fritzberg | A23L 3/361 426/523 |
| 4,071,304 | A | * | 1/1978 | Chauvin | B01J 2/16 209/250 |
| 4,193,758 | A | * | 3/1980 | Peterson | A23F 5/043 426/466 |
| 5,522,156 | A | * | 6/1996 | Ware | B09C 1/06 34/356 |
| 6,000,144 | A | * | 12/1999 | Bussmann | A23F 5/043 34/332 |
| 6,125,549 | A | * | 10/2000 | Pikus | F26B 3/205 34/135 |
| 2008/0022547 | A1 | * | 1/2008 | Shivvers | F26B 3/205 34/333 |
| 2008/0138480 | A1 | | 6/2008 | Bows et al. | |
| 2011/0027417 | A1 | * | 2/2011 | Corrigan | A23K 40/30 426/61 |
| 2011/0212149 | A1 | * | 9/2011 | Lobee | A23P 30/30 424/401 |
| 2013/0298780 | A1 | * | 11/2013 | Cheinet | A23B 7/0053 99/367 |

FOREIGN PATENT DOCUMENTS

| | | |
|---|---|---|
| GB | 1530784 A | 11/1978 |
| JP | H08213160 A | 8/1996 |

OTHER PUBLICATIONS

Alikhani et al., "Adsorption Drying of Corn in Zeolite Granules Using a Rotary Drum" Drying Technology, vol. 10, No. 3, Jun. 1, 1992, pp. 783-797 (15 pages).

\* cited by examiner

COOKING SNACK FOODS

BACKGROUND OF THE INVENTION

1. Technical Field

The present invention relates to a method of cooking snack foods, and in particular to such a method which has low capital and operating costs, high energy efficiency, and low waste heat. The present invention has particular application in the manufacture of snack foods produced by expanding a precursor snack food element or piece, such as a pellet.

2. Description of Related Art

A number of cooking processes are commonly used to produce a variety of different foodstuffs. Frying is particularly used to cook snack food products such as potato chips and expanded snack chips produced from pellets. Baking and toasting are also used in snack chip manufacture.

There is a generally recognised desire in the snack food manufacturing art to reduce manufacturing costs of the cooked, finished product. However, it is also necessary to ensure that the cooking process still produce a high quality product to the consumer which meets customer acceptance and is reliably and consistently achievable despite high production volumes. In particular, snack food chips are normally required to meet very strict customer acceptance criteria for the respective product, for example having specific moisture and oil-in-chip contents, and the desired taste, organoleptic and other sensory attributes.

Frying is commonly used to make snack foods. However, frying can result in high oil content in the snack food, and there is a general desire to reduce the oil content without reducing the consumer acceptance of the product. Baking and toasting can avoid high oil content but can lead to product variability or products which may not meet the desired taste, organoleptic and other sensory attributes required by the consumer.

Consumers desire snacks that have lower calories than are possible with traditional cooking techniques like oil frying. Although oil frying adds calories to a snack food product, oil frying is often necessary to achieve heat transfer rates high enough to be economically viable. These high rates also create flavor by browning the outside of the snack via the Maillard reaction. The snack food industry desires a heat transfer medium that can achieve fast heat transfer rates as well as contribute low/no calories to the final snack food product. Additionally, the food industry desires the ability to decouple the heat transfer rate from the processing temperature to achieve new effects in flavor, texture and other such desirable attributes.

A variety of cooking media and heat transfer modes have been used for cooking and/or dehydration of snack products in commercial processes. Hot air/gas processes are typically slow or necessitate the use of very high temperatures to achieve the heat transfer rates necessary to achieve expansion and desirable texture, with the use of high temperatures promoting undesirable acrylamide formation and burning. Liquids such as oil, water and glucose provide better heat transfer rates than air, but are difficult to remove from the finished snack food product once the surface is wetted with the heat transfer medium, especially in the case of oil and glucose where volatility cannot be used to remove excess at the end of the process, leading to a caloric contribution to the finished product from the heat transfer medium. Also, the cooking temperatures may be limited to the boiling or smoke point of fluids, meaning that desirable Maillard chemistry may not occur at significant levels.

It is known to reduce fat in fried snack foods by using a non-oil medium to cook the snack food. Existing technologies can achieve significant reductions in fat content down to about 20 wt % fat content for snack products. Removing oil/fat as a cooking medium allows a step change reduction in oil/fat content as compared to frying.

For example, EP-A-1774857 discloses a cooking method for snacks such as potato chips or the like in which a raw snack food piece is immersed in a bath of a preheated granular medium such as food-grade salt (sodium chloride) and permitted to expand, after which the expanded snack is removed from the granular medium. Cooking can be completed by a subsequent toasting operation. Additionally, artisanal cooking of food in sand is known in some countries, for example India and Malaysia. Snack products, particularly formulated pellets and nuts, have been cooked, roasted or expended in a range of inorganic materials such as salt or sand, with examples of pellets cooked in salt being commercially available.

However, the thermal transfer properties of these granular materials are fixed. Moreover salt can impart an excessive salt flavor to the snack food and sand can contaminate the snack food after cooking. When such granular media are to be used for cooking some snack food products, such as pellets which expand during the cooking process, the pellet formulations may need to be adapted to perform optimally in these media, which may be to the detriment of other product quality attributes. These known processes use a solid heat transfer medium of salt or sand which must be heated via thermal conduction from a wall of a vessel containing the solid heat transfer medium or by thermal radiation. Such processes are cumbersome and expensive to implement. These processes are also not versatile, and may not be readily utilized for different snack food products. The use of thermal conduction to provide heat transfer in the static particulate bed has limitations relating to the surface area of the heated part of the apparatus and contact time.

SUMMARY

The present invention aims to provide a method for cooking snack foods, such as snack food chips produced from pellets, which can at least partially overcome the problems of known snack food cooking methods discussed above.

The present invention accordingly provides a method of cooking a snack food, the method comprising the steps of:
  a. providing a bed comprising a plurality of particles, wherein the particles are composed of, comprise or consist of a material which is magnetic and/or electro-conductive;
  b. heating the particles in the bed to form a cooking medium in the form of a heated bed of particles, wherein in step b the particles are heated at least partially by electromagnetic induction;
  c. providing a plurality of snack food precursor elements in the cooking medium thereby to cook the elements to form a plurality of cooked snack food pieces, wherein the heated particles transfer heat into the elements by thermal conduction; and
  d. separating the plurality of snack food pieces and the cooking medium.

Preferred features are defined in the dependent claims.

The present invention is predicated on the finding by the present inventors that particles of materials such as ceramics and metals which are magnetic and/or electroconductive can be heated at least partially by electromagnetic induction to be used as heat-transfer media in a static or mobile bed to transfer heat to the snack food product by particle-to-particle thermal conduction, known as advection, between the mobile particles during a cooking process.

The particles are inert, which is defined herein as meaning that the particles do not react with or flavor the snack food product during the cooking method. The particles can be selected and controlled so that the particles do not end up as a component of, or contaminating, the finished snack food product. Such particles provide a cooking medium which is selected to provide selected heat transfer properties, and to be matched to selected snack food product formulations and treatments. The cooking medium is readily customizable for a selected snack food product, for example by varying the bulk density of the static or mobile bed, as well as the particle size.

The particles are heated by induction, and optionally additionally by thermal heating (for example radiation, conduction and/or convection). The particles can be readily separated from the final snack food product. The particulate cooking medium is non-caloric and does not add sodium to the snack food, which is a potential health problem when cooking in salt as disclosed in EP-A-1774857. The inert particulate cooking medium is readily cleaned and sanitized after the cooking step, and is reusable in a subsequent cooking process.

Furthermore, the particles may be composed of a material which has low thermal conductivity. The preferred particles are hollow bodies which have millimeter scale dimensions and thin wall thickness. Such hollow bodies, when composed of ceramic material, for example, would be expected to have low thermal conductivity. However, when such particles of a low thermal conductivity material are utilised in a mobile bed, the low thermal conductivity of the material does not limit or prevent effective heat transfer from the particles to the snack food product because the heat transfer is by direct particle-particle heat transfer, known in the art as advection, rather than thermal conduction.

In general, the thermal conductivity in granular particulate systems is low, and even more so for such systems comprising hollow particles, which typically have a thermal conductivity on the order of 0.5 W/m·K, so may effectively be considered as insulating materials by those skilled in the art. However, in accordance with a preferred aspect of the present invention, motion of the particles, for example by agitation or tumbling, allows the exploitation of the thermal properties of these materials without relying purely on thermal conduction. Instead, the surface of the product to be heated, in particular cooked, namely the snack food precursor element, for example a pellet, is heated by thermal advection from the particle wall to the product surface.

The method of the preferred embodiments of the present invention uses a static or mobile bed of particles, for example hollow particles, in particular hollow spheres or any other geometric shape that can permit control of the flow characteristics of a particulate bed, which are heated and provide conduction heat transfer to the product to be cooked. The thermal properties of the particle may be controlled by selection of particle size, wall thickness and composition of the wall to match specific snack product requirements for heat transfer.

The method of the preferred embodiments of the present invention therefore readily allows the control of the heat transfer characteristics of the cooking medium. Adjustable heat transfer properties also enable the matching of the cooking process to the needs of particular ingredients, for example a high heat transfer rate for expansion at low temperatures.

The method of the preferred embodiments of the present invention uses hollow particles as the cooking medium which permits the use of materials that, because of their high density, such as a metal or ceramic material, would otherwise crush or damage the finished snack product. The wall thickness can be selected to control the particle apparent density and the overall mechanical forces imparted on the snack product during cooking.

The hollow particles can have a low thermal mass, which allows heating of the particles with reduced energy consumption as compared to heating solid particles. The hollow particles also reduce the density gradient between the cooking medium and the snack product, which permits control, and reduction, of contact time between the cooking medium and the snack product.

In some embodiments of the present invention the particulate bed forming the cooking medium is static. In other embodiments of the present invention the particulate bed forming the cooking medium is mobile, and the particulate bed forming the cooking medium is mechanically moved, for example by being tumbled, typically in a drum, or stirred, typically using one or more stirrers at any suitable orientation, or vibrated, for example by being located on a vibrating support, so as to be mobile during the cooking process. This motion of the heated particles assists the achievement of the desired advective heat transfer from the heated particles to the snack food precursor elements to be cooked. As is known to those skilled in the art, a parameter called the Froude number, which is dimensionless, defines for a flowable material the ratio of the inertial flow to the external field, which may be gravity, and quantifies the degree of flow of the material. In the context of the present invention, in which a particulate bed is mobile as a result of a mechanical input, the Froude number represents the motion of particles of the particles in the mobile particulate bed.

In some embodiments of the present invention, in which solid particles in a bed are heated and then transfer their thermal energy to products to be cooked within the bed, it has been found that there is a desired range of mobility of the particulate bed efficiently to achieve thermal transfer between the particles and the products to be cooked. The degree of thermal transfer between the particles and the products to be cooked can be represented by the heat transfer coefficient U, in units $W/m^2 \cdot K$, for the particles in the mobile particulate bed. The heat transfer coefficient can be measured experimentally for a given particle and Froude number combination.

It has been found that the heat transfer coefficient for a variety of different particles for use in the method of the present invention varies with Froude number in a relationship in which the heat transfer coefficient is enhanced within a Froude number range of from 0.01 to 0.5, preferably from 0.1 to 0.3, for example from 0.15 to 0.25.

For example, when the heated particulate bed is tumbled within a horizontal drum having a plurality of paddles within the drum which mechanically tumble the bed of particles, the heat transfer from the heated particles is dependent upon the mobility of the particles within the bed, and increases with increasing particle mobility, or agitation, until the particle mobility becomes so large that the enhanced motion reduces the ability of the particles to be heated by mutual contact therebetween and to transfer the thermal energy in the particles to the products dispersed within the mobile particulate bed. For a mechanical system used in the present invention, such as a tumbler drum or a stirrer, in which particulate material is mechanically moved by a rotating paddle, or similar rotating device, the Froude number (Fr) is herein defined by the following formula:

$$Fr = \omega \sqrt{\frac{R}{g}}$$

where ω=angular rotational velocity (rad/s); R=radius (m) and g=gravitational acceleration (m/s$^2$).

For a rotating drum, the rotational velocity of the drum and the drum internal radius are the relevant parameters for calculating the Froude number according to the above formula. For example, if the angular rotational velocity (ω) of the drum is 18.6 rad/s (i.e. 17.8 rpm) and the drum radius (R) is 0.125 m, given gravitational acceleration (g) of 9.81 m/s$^2$, the Froude number is calculated as 0.21.

It has been found that when the Froude number is within the range identified above, particularly when using a rotating drum with internal paddles to provide mobility to the particulate bed, the thermal transfer coefficient U, which is the coefficient for thermal transfer from the wall to the bed at a location where the wall is submerged by the bed (e.g. a lower part of the wall of the heated drum), can be enhanced. The thermal transfer coefficient U also represents the particle-to-particle thermal transfer within the moving particulate bed.

Additionally the pressure or movement of particles against the expanding product has the potential effect of altering the microstructure at the snack food surface by compaction of the softened expanding matrix during cooking. This can introduce new microstructures into the snack foods, resulting in interesting new products for the consumer.

The particles have electroconductive and/or magnetic properties by the inclusion in the particle of an electroconductive material, such as a metal layer, for example an austenitic stainless steel and/or a magnetic material, such as a ferromagnetic stainless steel or a ferrimagnetic material such as ferrite.

Such an electroconductive material may be rapidly heated by the application of electromagnetic radiation which induces eddy currents in the electroconductive material, and correspondingly permits rapid cooling of the particles. A magnetic material may also be rapidly heated by the application of a magnetic field which induces magnetic hysteresis in the magnetic material, and correspondingly permits rapid cooling of the particles.

In preferred embodiments of the present invention, the particle may comprise a magnetically susceptible inner core, sub-layer or inclusion which enables one or more of the following process functions: 1. Particle detection for consumer protection—especially in the case of ceramic particles which would otherwise not be readily detectable on or in the snack food; 2. Particle removal from the finished snack food product by magnetic separation; 3. Particle direct heating by electromagnetic induction which when combined with a low particle thermal mass enables quick heating and cooling, preventing over-cooking of the snack product.

As discussed above, cooking foodstuffs using granulated salt as a cooking medium, or using sand in accordance with artisanal practice, is known. The present invention provides a heated static or mobile bed of particles which can readily control the heat transfer characteristics from the mobile particulate bed to the snack food products to be cooked because the variable of bulk density of the bed is provided.

Furthermore, by providing selected particle properties it is also possible to control the heat transfer characteristics, specifically the heat transfer coefficient and thermal mass, of the particles. The particle properties can be readily selected or tailored to meet the particular needs of a given snack food product to be cooked. The particles can be customised by selecting the particle material, size and density to achieve desired cooking properties.

The present invention provides an electroconductive and/or magnetic particle, by the provision of an electroconductive and/or magnetic core, sub-layer or inclusion, which can enable induction heating of the particles, in particular rapid heating, which efficiently transfers heat to the snack product, and then can be rapidly cooled after the cooking process.

The preferred embodiments of the present invention can utilize for the particles a combination of specific size, material and wall thickness to provide defined thermal characteristics of the heating medium. Additionally, provision of an electroconductive and/or magnetic material permits the use of induction heating for rapidly heating the cooking medium, and since the cooking medium has a low thermal mass, the cooking medium can also rapidly cool. The heat transfer is not dependent upon the wall temperature of a vessel or heater, or on contact time, and so can be decoupled from the heating rate.

The preferred embodiments of the present invention use hollow spheres to create a particulate bed which, when static, would be considered by those skilled in the art to constitute a good thermal insulator. By employing a mobile bed in some embodiments, then even if the material of the particles has low thermal conductivity, the bed itself provides good thermal transfer to the snack food product as a result of thermal advection, which is particle-to-particle thermal transfer by conduction in the mobile bed.

Furthermore, the preferred embodiments of the present invention use magnetic materials which are generally considered by those skilled in the food manufacturing art not to be food safe. However, the use of magnetic inclusions, magnetic layers or magnetically susceptible stainless steel or magnetically susceptible ceramics allows this technical solution to be safely implemented because the magnetic particles can be readily detected on or in the finished snack food products, and if necessary removed by application of a magnetic field.

The preferred embodiments of the present invention use a mobile bed of particles that are heated and provide conduction heat transfer to the product to be cooked. The thermal properties of the spheres may be controlled by selection of particle size, wall thickness and composition of the wall to match specific snack product requirements for heat transfer. This solution allows the control of heat transfer characteristics. The use of hollow particles permits the use of materials that would otherwise crush or damage the finished snack product by manipulation of wall thickness to control the particle apparent density and the overall mechanical forces imparted on the snack product. This preferred embodiments of the present invention have the potential to alter the microstructure at the surface of the snack food product by compaction of the softened expanding matrix during cooking, hence giving a textural gradient to the snack food product.

BRIEF DESCRIPTION OF THE DRAWINGS

An embodiment of the present invention will now be described, by way of example only, with reference to the accompanying drawings, in which.

DETAILED DESCRIPTION

Figure 1:
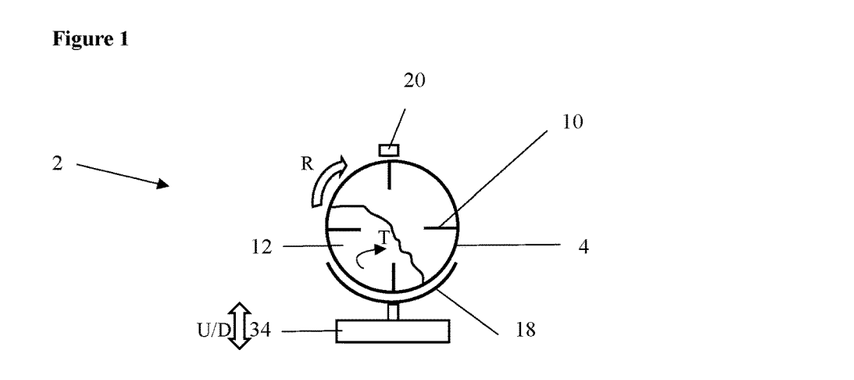
FIG. 1 is a schematic end view of a cooking apparatus for use in a cooking method in accordance with an embodiment of the present invention.
Figure 2:
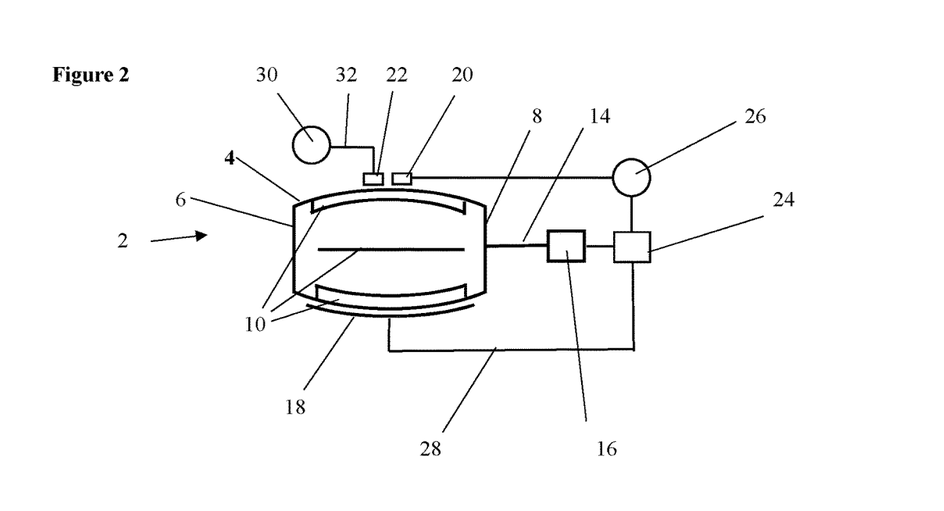
FIG. 2 is a schematic side view of the cooking apparatus of FIG. 1.

Referring to FIGS. 1 and 2, there is shown an apparatus 2 for cooking snack foods for use in a cooking method in accordance with a first embodiment of the method of the present invention.

The apparatus 2 comprises a rotatable drum 4, which is substantially cylindrical. The drum is typically composed of a non-metallic material which is transparent to electroconductive radiation. The drum 4 has an open end 6 and a closed end 8. A plurality of paddles 10 are located within the drum 4. The paddles 10 may have a height, length and orientation so that when the drum 4 is rotated, as shown by the arrow R in FIG. 1, a bed of particulate material 12, forming a cooking medium, is tumbled, as shown by the arrow T in FIG. 1. The paddles 10 may be longitudinally or helically oriented within the drum 4. A for use in a cooking method driveshaft 14 connects the closed end 6 to an electrical motor 16 which is configured to rotate the drum 4 about the central longitudinal axis of the drum 4.

An electromagnet 18 is located adjacent to the drum 4, for example along a lower external side of the drum 4, or as a loop encircling the drum 4. The electromagnet 18 is configured inductively to heat the bed of particulate material 12. The electromagnet 18 may alternatively be located at another location external of the drum 4. Additionally, other suitable heating devices, such as radiant heaters, may be employed to heat the bed of particulate material 12 within the drum 4.

A temperature sensor 20, typically an infra-red pyrometer or other non-invasive temperature measurement device which can function in an induction field, is also located adjacent to the drum 4. An infra-red pyrometer would be located and oriented to have a direct line of sight into the interior of the drum in order to directly measure the temperature of the particulate bed. Alternatively, any other non-invasive temperature measurement device may be located, for example along an upper external side of the drum 4, to measure the temperature of the exterior of the drum 4, which can be employed indirectly to measure the temperature within the drum 4, for example of the particulate bed, by calculation. Alternatively, one or more temperature sensors may be located within the drum 4, or at another location external of the drum 4.

Electrical circuitry 28 connects the electromagnet 18 and the temperature sensor 20 to a control unit 24, which controls the operation of the motor 16 and the electromagnet 18, and a temperature control 26. The control unit 24 and the temperature control 26 function to control the drum rotation and heating to achieve a desired heating profile for the bed of particulate material 12, to form the cooking medium, and the products to be cooked therein. For example, the bed of particulate material 12 is heated at a preset heating rate for a preset period to achieve a preset maximum temperature, and the drum 4 is rotated at a preset rotational velocity. The control unit 24 may controllably power the electromagnet 18 using pulse width modulation, as known to those skilled in the art.

A second temperature sensor 22 is connected to a cutout/alarm device 30 by electrical circuitry 32. If the measured temperature exceeds a preset value, an alarm may be triggered and the radiant heater 18 may be switched off automatically.

In FIGS. 1 and 2 the drum 4 is shown in a substantially horizontal orientation, with the central longitudinal axis of the drum 4 being substantially horizontal. However, the drum 4 can be oriented at any suitable angle. In the preferred embodiment illustrated, the drum 4, and the associated drive mechanism of the driveshaft 14 and motor 16, are mounted on a tilting mechanism 34, which is schematically illustrated. The tilting mechanism 34 can selectively tilt the central longitudinal axis of the drum 4 at a desired angle to the horizontal, for example as shown by the arrow U/D. For example, when the drum 4 is charged with the bed of particulate material 12, to form the cooking medium, and the products to be cooked therein, the open end 6 can be tilted upwardly, and when the drum 4 is discharged, to remove the bed of particulate material 12 and cooked product therefrom, the open end 6 can be tilted downwardly. During cooking, the drum 4 can be horizontally oriented.

Figure 3:
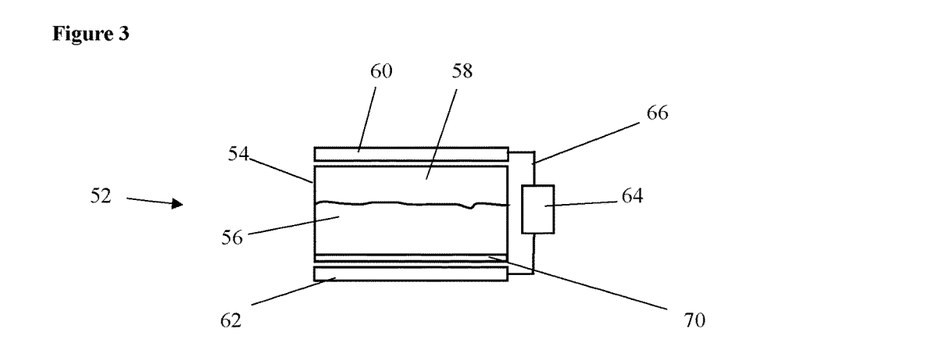
FIG. 3 is a schematic side view of a cooking apparatus for us in a cooking method in accordance with a further embodiment of the present invention.

FIG. 3 is a schematic side view of a cooking apparatus 52 for use in a cooking method in accordance with a further embodiment of the present invention. The apparatus 52 comprises a cooking vessel 54 defining a chamber 58 in which a bed of particles, forming the particulate cooking medium 56, is, in use, received. An electromagnetic induction system, comprising, in the illustrated embodiment, a pair of electromagnets 60, 62 adjacent to the cooking vessel 54, the electromagnets being connected to an electrical power system 62 by electrical circuitry 66, at least partly surrounds the cooking vessel 54. The walls of the cooking vessel 54 are transparent to electromagnetic radiation emitted from the electromagnets 60, 62 when the electromagnets 60, 62 are powered by the electrical power system 64.

In use, the particulate cooking medium 56 comprises or consists of a material which is magnetic and/or electroconductive. When the electromagnets 60, 62 are powered by the electrical power system 64, electromagnetic radiation emitted from the electromagnets 60, 62 heats the particles in the bed by electromagnetic induction to form the cooking medium which cooks a plurality of snack food precursor elements provided in the cooking medium. This cooking forms a plurality of cooked snack food pieces. The inductively heated particles transfer heat into the snack food precursor elements by thermal conduction.

In an alternative configuration, the cooking vessel 54 may be located within a peripheral coil surrounding the cooking vessel 54 though which coil a current in use flows to generate an electromagnetic field which is used inductively to heat the particulate cooking medium 56. Any known electromagnetic configuration may be employed inductively to heat the particulate cooking medium 56.

In the embodiment illustrated in FIG. 3 the bed of particles, and therefore the cooking medium, is static. The particles and snack food precursor elements may be introduced into the chamber 58 of the cooking vessel 54 by any convenient method. Also, the particles and cooked snack food pieces may be removed from the chamber 58 of the cooking vessel 54 by any convenient method. However, in alternative embodiments using electromagnetic induction to heat the bed of particles, the bed of particles, and therefore the cooking medium, is mobile, for example by introducing tumbling motion into the bed of particles as described above with reference to the embodiment of FIGS. 1 and 2, or by any other suitable method to provide a mobile particulate bed, for example a stirrer within the bed or vibration plate upon which the cooking vessel is located. In the illustrated embodiment an optional vibration plate 70 is located beneath the cooking vessel 54.

In the method, there is provided a bed comprising a plurality of particles. This bed provides a cooking medium. The particles comprising the cooking medium may be selected to provide independently selected particle density, bulk density and/or thermal properties of the cooking medium. In particular, the particle size, particle structure and morphology and the material(s) used to form the particle may be selected to control the heat transfer between the cooking medium and the snack food product. These parameters may also be selected to control the adhesion of the particles of the cooking medium to the surface of the snack food product.

The density of the particles, and of the cooking medium, and the bed depth may be controlled to provide a desired downward pressure on snack foods present in the bed. For example, when a snack food pellet is heated it softens, and if a softened product sees high mechanical stress, due to the pressure arising from the particulate cooking medium above the product, then the surface of the softened product may be subjected to differential compaction relative to the centre of the product, which may result in the formation of a novel texture, which in turn can provide for the consumer a new snack food experience.

Typically, the particles have a density of from 250 to 7500 kg/m$^3$, for example from 400 to 5000 kg/m$^3$.

The particle shape is selected to achieve thermal uniformity of the bed, through particle-to-particle friction that permits the transmission of shear through the bed. Particles that have an essentially frictionless surface, as a result of the particle composition and surface morphology, are undesirable because they would exhibit free movement of particle layers that slip without the mixing and advection that promotes good heat transfer. Conversely, highly polyhedral particles such as cubes have a high degree of internal friction that would result in the bed "seizing" and slipping against the internal equipment walls without mixing or the desired advective heat transfer process (defined here as heat transmission through the movement of particles). Hence, there exists a degree of desirable bed friction that promotes mixing without being so high as to favour seizing. In preferred embodiments, the particles are spherical or substantially spherical with an outer surface formed of a plurality of planar facets. For example, the particles may be icosadodecahedral, which is a polyhedron with twenty triangular faces and twelve pentagonal faces. However, other geometric profiles that would control bed flow characteristics, specifically cylinders, may be employed.

Typically, the particles have a particle size of from 40 μm to 5 mm, for example from 0.5 to 3 mm, preferably from 0.5 to 2 mm. When the particles are from 0.5 to 2 mm is dimension, hollow particles can readily be fabricated, the particles exhibit high heat transfer by advection and the particles have low adhesion to the snack food. Particles smaller than 0.5 mm may be used but preferably have a solid form, have high density and/or are magnetic to assist removal from the snack food product. Particles smaller than a particle size of 40 μm tend to be too dusty, pose health and safety issues, and are difficult to remove from a snack food product. In preferred embodiments, the particles have a particle size distribution wherein at least 50 wt %, typically at least 75 wt %, of the particles have a particle size within the range of from 0.5 to 2 mm.

In one alternative embodiment, two or more different particles may be provided, the particles having the same dimensions but different material densities. The density of the individual uncooked snack food product, and preferably the density of the cooked product, may lie between the higher and lower particle densities. Such a configuration acts to ensure that the snack product remains immersed in the cooking medium to assure uniformity of thermal treatment during cooking.

Particle size may be selected in conjunction with particle density to manipulate particle-product adhesion characteristics, such that wet or sticky surfaced snack food products will not retain the particles into the finished snack food product. Smaller particles may tend to have a stronger adhesion as compared to larger particles; lower density particles may tend to have a stronger adhesion as compared to higher density particles.

The particles may have a monomodal particle size distribution. Preferably, such a particle size distribution is employed for wet/sticky snack food products and has a narrow distribution about the mean particle size.

Alternatively, the particles may have a multimodal particle size distribution, comprising a first fraction having a particle size defining a first particle size distribution and a second fraction having a particle size defining a second particle size distribution. Such a multimodal particle size distribution, for example a bimodal particle size distribution, is employed in combination with dry snack food products. The bimodal distribution may be utilised to further modify the heat transfer characteristics. The smaller distribution may be matched to the dimensions of the interstitial volume between the larger particles. The multimodal particle size distribution may accordingly be selected so that when the particles of the first fraction are closely packed, voids are formed between the closely packed particles and the particles of the second fraction are dimensioned to fit within the voids.

In preferred embodiments, the particles are composed of, comprise or consist of a metal or a ceramic material.

In some embodiments, the particles are composed of, comprise or consist of stainless steel, optionally a ferritic or austenitic stainless steel, further optionally stainless steel 304, 316, 440, 420 or 17-PH. Stainless steel readily allows cleaning and sanitation of the particles using conventional cleaning products.

In some embodiments, the particles are composed of, comprise or consist of at least one ceramic material selected from alumina, aluminum nitride, zirconia, titanium dioxide, silicon carbide, silicon nitride, silicon dioxide, boron nitride, boron carbide, yttrium oxide, or cordierite, or any mixture of two or more thereof.

The particles are composed of, comprise or consist of a material which is magnetic and/or electroconductive. The particles are heated at least partially by electromagnetic induction.

In accordance with this aspect of the invention, there is typically provided in the particles of the cooking medium, a structural part, such as a layer, a shell, a core or an inclusion, or any combination thereof, is composed of a magnetic material, i.e. a material susceptible to a magnetic field, for example a ferromagnetic material or a ferrimagnetic material. The use of such a magnetic material in the particle permits the particle effectively to be removed and separated from the food product after cooking, and detected in the finished product, by the use of an applied magnetic or electromagnetic field located in the product exit path from the bed. When a ferromagnetic material and/or a ferrimagnetic material is in the particle, a magnetic force may be applied to the snack food pieces separated from the cooking medium to remove particles from the snack food pieces. Alternatively or in addition, when a ferromagnetic material and/or a ferrimagnetic material is in the particle, a magnetic force may be applied to the snack food pieces separated from the cooking medium to detect the presence or absence of particles on the snack food pieces.

Such magnetically susceptible particles may also be subjected to an oscillating magnetic field that induces eddy current heating and/or magnetic hysteresis heating which heats the particles of the cooking medium and hence heats the snack food. Such a cooking medium is subjected to direct heating of all of the particles composed of the selected magnetic material rather than by conduction and advection of heated particles, and consequently the direct particle heating delivers a high degree of temperature uniformity throughout the particles of cooking medium. Additionally, the use of such magnetic materials in combination with particles of low thermal mass can provide a cooking system in which the cooking medium and the snack food product can be heated and cooled rapidly to give precise control over the cooking process.

The particles may have a variety of different structures.

In some embodiments, the particles are hollow. The hollow particles have a wall which may be composed of one or plural layers. Typically, at least one layer comprises a magnetic or electrically conductive material. The hollow particles may have a wall thickness of at least 40 µm. The wall thickness is typically from 10 to 40% of the particle size, for example diameter, of the hollow particles. At least one of the layers may be coated by vapor deposition onto the particle outer surface. In one example, the particles comprise hollow ceramic particles, for example of alumina or silica, coated with a layer of stainless steel, for example 304 or 316 stainless steel, which is from 5 to 20 µm thick and provides an electroconductive coating which permits the particle to be heated by electromagnetic induction, and also enhances the toughness of the particles. The stainless steel layer may be coated by vapor deposition.

In other embodiments, the particles comprises a shell surrounding a central core. The shell may be composed of one or plural layers. The shell may have a wall thickness of at least 40 µm. The wall thickness is typically from 10 to 40% of the particle size, for example diameter, of the particles. The shell may be composed of a metallic material and the core may be composed of a ceramic material. Alternatively, the shell may be composed of a polymeric material and the core may be composed of a metallic material. In each case the metallic or ceramic material may be a ferromagnetic material and/or a ferrimagnetic material.

In further embodiments, the particles are solid with inclusions dispersed in a matrix. The matrix may be composed of a metallic material and the inclusions may be composed of a ceramic material. For example, the matrix may be composed of a first ceramic material and the inclusions may be composed of a second ceramic material, and either or each of the first and second ceramic materials is a ferromagnetic material and/or a ferrimagnetic material.

In one example, the particles comprise ferrite inclusions dispersed in a matrix of yttrium oxide, optionally coated with a layer of stainless steel, for example 304 or 316 stainless steel, which is from 5 to 20 µm thick and provides an electroconductive coating which permits the particle to be heated by electromagnetic induction.

Additionally, the selection of a particular particle density can afford control of the thermal mass (thermal mass=$\rho \times C_p$, where $\rho$ is the density and $C_p$ is the heat capacity) of the particle such that the response of the cooking medium to changes in local conditions can be controlled. For example, by selecting low or high thermal mass, the cooking medium may respond quickly or slowly, respectively, to changes in temperature to provide a desired thermal response for the cooking medium.

In a next step of the method of the present invention, the particles are heated and form a static cooking medium, or are moved in the bed, for example by tumbling, to form a cooking medium comprising the heated, mobile bed of particles. The particulate cooking medium may be heated by any number of means of transferring heat to the media. For example, the particles may be additionally heated by radiation, e.g. using a radiant heater, by conduction, e.g. by contact with a heated body, or by convection, e.g. by a hot air stream. In the bed, the particles are heated at least partially by advection between the particles.

The particle motion may be achieved by the use of one or more mechanical agitators, for example one or more paddles, blades or screws located within the particulate cooking medium. The particulate cooking medium may be held in a vessel having an outer wall which is heated. For example, the particulate cooking medium may be in a static vessel containing one or more movable mechanical agitators, such as a paddle, blade or screw. Alternatively, the particulate cooking medium may be in a moving vessel, such as a rotatable drum, containing one or more fixed mechanical agitators having an outer wall which is heated.

Additionally or alternatively to the provision of one or more mechanical agitators, the particle motion may be achieved or enhanced by flow of a gas, as discussed above, through the particulate cooking medium.

The bulk density of the cooking medium may be selected to be lower, equal to or higher than the density of the uncooked or finished snack food product. Such a cooking medium density control in turn controls the physical contact during cooking between the cooking medium and the snack food product.

Typically, the cooking medium has a bulk density of from 250 to 1000 kg/m$^3$, for example from 400 to 800 kg/m$^3$. Typically, the cooking medium has a depth of from 20 mm to 1 m, optionally from 20 mm to 500 mm, for example from 50 mm to 250 mm. The selected cooking medium depth is sufficient to immerse or submerge the snack food precursor elements but not so high that the snack food is crushed by the weight of the particles in the cooking medium that are located above the snack food during the cooking process, although free-flowing particles in the cooking medium tend to act similar to a fluid and exert a substantially isotropic pressure, similar to a "hydraulic" pressure, on the snack food in the cooking medium.

In preferred embodiments, the cooking medium comprises or consists of the solid particles in a gas. The gas may be air. Alternatively, the gas may be a non-oxidative gas selected from nitrogen, argon, carbon dioxide, carbon monoxide, or any mixture thereof. Preferably, the gas further comprises water vapour, for example steam. Typically, the gas is at an absolute pressure of from $20 \times 10^{-3}$ to 50 N/m$^2$.

Preferably, the cooking medium is free of liquid, and furthermore free of oil, fat or lipids. Since no oil or other liquid needs to be added to the particulate cooking medium, the resulting snack food products can be low in fat.

Then, in the next step of the method a plurality of snack food precursor elements are provided in the cooking medium thereby to cook the elements to form a plurality of cooked snack food pieces. The heated, mobile particles transfer heat into the snack food precursor elements by thermal conduction.

Typically the snack food precursor elements comprise starch-based expandable pellets, which are conventional in the art. The pellets may have been subjected to some precooking or other preconditioning prior to being cooked in the cooking medium, for example in the form of pellets which have been formed by extrusion in which the composition of the pellet has been cooked during the extrusion process. Alternatively, the snack food precursor elements may be raw, for example in the form of potato or other vegetable slices. Further alternatively the snack food precursor elements comprise an expandable grain, such as popcorn (maize kernels) or oats. The snack food precursor elements may comprise partially cooked bread, for example pita bread.

Preferably, the bulk density of the cooking medium is selected and controlled, in conjunction with the density of the snack food precursor elements, so that the snack food precursor elements can reliably be immersed or submerged in the cooking medium to achieve uniform heating from the cooking medium, so that there is high product uniformity in the cooked snack food pieces. If the bulk density of the cooking medium is too high relative to the snack food precursor elements, then it is difficult to achieve reliable immersion or submerging in the cooking medium. Smaller particles tend to have a higher friction because of increased particle-particle contact area, and so a higher density differential between the bulk density of the cooking medium and the density of the snack food precursor elements can be tolerated, e.g. with smaller particles, even with a cooking medium bulk density higher than the density of the snack food precursor elements, the snack food precursor elements can be reliably immersed or submerged in the high particulate friction cooking medium for a sufficient time to achieve uniform cooking and expansion.

In some embodiments, the cooking medium has a bulk density which is lower than or equal to the density of the snack food precursor elements and/or the density of the cooked snack food pieces. For example, the cooking medium may have a bulk density which is lower than the density of the snack food precursor elements and greater than the density of the cooked snack food pieces. Typically, the cooking medium comprises a plurality of first particles and a plurality of second particles, wherein the first and second particles have respective first and second densities which are different. Preferably, the first density is higher than the second density and during cooking the first particles form a lower player and the second particles form an upper layer. In preferred embodiments, the density of the snack food precursor elements is between the first and second densities, and typically the density of the cooked snack food is lower than the first and second densities. This provides that after the snack food precursor element has cooked, and typically expanded, the density of the snack food is lowered, and this causes the cooked snack food to float to the top of the cooking medium and to be ejected from the cooking medium so as to sit on the top surface of the cooking medium, and thereby substantially terminate the heat transfer and cooking process. Therefore the selection of a bulk density for the cooking medium relative to the density of the snack food precursor elements and the cooked snack food can provide a control of the effective cooking time in the particulate cooking medium.

In some embodiments, the snack food precursor elements are located within the particles after heating the particles. In other embodiments, the snack food precursor elements are located within the particles prior to heating the particles.

Finally, in the cooking method, the plurality of snack food pieces are separated from the cooking medium.

In some embodiments, there is a batch cooking method, in which a batch of the snack food precursor elements is located within the bed of particles and after cooking the batch of cooked snack food pieces is removed from the cooking medium. The batch may be located within the bed of particles at room temperature (20-30° C.) and then the bed and batch may be heated. Alternatively, the bed may be preheated to a desired temperature prior to location of the batch therein. The cooked snack food pieces and the cooking medium may be separated by at least one of sieving, size exclusion, density difference, vibration, gravity or magnetic separation.

In other embodiments, there is a continuous cooking method, in which a supply of the snack food precursor elements is continuously or intermittently charged into the bed of particles which has been preheated to a desired temperature. After cooking, a mixture of the particles and cooked snack food pieces is continuously or intermittently removed from the bed. Preferably, the supply of the snack food precursor elements is continuously charged into the bed of particles and the cooked snack food pieces are continuously removed from the bed. The particles and the cooked snack food pieces are separated and the separated particles are recycled back to the bed. A treatment step may remove debris from the recycled particles.

For both the batch and continuous processes, when induction heating is employed to heat the particles, pre-heating of the particles may not be required with a cooking medium of low thermal mass, which also cools quickly on removal of the inductance heating.

Preferably, the snack food precursor elements comprise starch-containing pellets and when the pellets are cooked to form the cooked snack food pieces the pellets expand and reduce in density.

In some embodiments, the snack food precursor elements are coated with a topical seasoning prior to being provided in the cooking medium. Alternatively, a topical seasoning may be introduced into the bed of particles prior heating the bed of particles and/or prior to providing a plurality of snack food precursor elements in the cooking medium. Typically, the topical seasoning comprises an oil-free composition.

In one example, solid seasoning granules are introduced into the bed and the seasoning granules have a small dimension than the particles of the cooking medium. The particles become coated by the seasoning granules. The seasoning granules are transferred onto the surface of the snack food when the snack food is in the agitated bed. When the snack food is separated from the particles of the cooking medium, the snack food is seasoned by the seasoning granules dispersed thereover. The composition of the solid seasoning granules may include a fat which is softened at the temperature of the bed when the solid seasoning granules are introduced into the bed so that the softened granules readily adhere to the particles.

In some embodiments, the cooked snack food pieces may be coated with a topical seasoning after separation from the cooking medium. The topical seasoning may comprise a topical oil a topical oil-in-water emulsion, or a topical water-in-oil emulsion. Typically, the topical seasoning coating comprises from 6 to 8 wt % of the total weight of the topically seasoned cooked snack food pieces. Such a topical seasoning may readily adhere to the surface of the cooked snack food pieces. Preferably, the topical oil or oil-in-water-in-oil emulsions having low water activity (Aw) and accordingly do not support microbiological growth under ambient conditions 20° C.).

The snack food precursor element typically has a mass of from 0.1 to 25 g, optionally from 0.1 to 10 g, for example from 0.5 to 5 g. Pellets have a typical mass of from 0.5 to 3 g; potato slices have a typical mass of from 2 to 4 g; and popcorn kernels have a typical mass of about 0.1 g.

The snack food precursor element typically has a water content of from 5 to 85 wt % based on the total weight of the snack food precursor element. For example, an expandable pellet may have a moisture content of from 6 to 15 wt %, for example from 8 to 11 wt %; potato slices may have a moisture content of about 80 wt %; and popcorn kernels have a typical moisture content of about 5 wt %; each based on the total weight of the respective snack food precursor element.

In preferred embodiments, the cooking medium is heated to a temperature of from 35 to 300° C., typically from 100 to 300° C., for example from 150 to 300° C. The temperature may correspond to a cooking temperature conventionally used in a cooking process, such as frying, baking, or toasting, used to cook the respective snack food.

In preferred embodiments, the snack food precursor elements are provided in the cooking medium to form the cooked snack food pieces for a cooking period of from 2 to 600 seconds, for example from 5 to 180 seconds, optionally from 5 to 60 seconds, further optionally from 5 to 30 seconds. In particularly preferred embodiments, the cooking period is from 10 to 20 seconds, which corresponds to a typical frying time for an expandable snack food pellet.

In one example, a static or mobile bed comprising 2 kg of hollow stainless steel particles, having a density of 450 kg/m$^3$, are heated inductively and achieve a temperature of 200° C. in a period of from 12 to 15 seconds. These temperature and time parameters correspond to a typical frying temperature and time for frying snack food pellets.

A surface of the snack food precursor element may have been pretreated to lower a moisture content of the surface. For example, the pre-treatment may comprise impinging air onto the surface of the snack food precursor elements, the impinging air typically being at a temperature of from 20 to 100° C.

The present invention will now be further illustrated with reference to the following non-limiting Examples.

Example 1

There was provided in a beaker a particulate bed cooking medium comprising a 0.25 liter volume of hollow stainless steel 17-4PH particles. The particles had a particle diameter of 2 mm and a density of 450 kg/m$^3$. These particles are available in commerce from Deep Springs Technology, LLC, of Toledo, Ohio, USA.

The particulate bed was static. An electrical coil surrounded the beaker and starch-based snack food pellet, already known for producing a fried snack food, was located in the particulate bed. An oscillating electric field was applied to the coil which produced a magnetic field within the beaker, and within the particulate bed. The stainless steel particles were heated inductively by applying electromagnetic radiation to the bed.

At a nominal power setting of 3 kW, the temperature of the static bed was seen to rise from ambient (nominally 25° C.) to 270° C. in 9 seconds. At that time the electrical power was switched off to terminate the inductive heating. The snack pellet was seen to be cooked and expanded.

The morphology of the resultant expanded snack food pieces was compared to the reference fried snack food produced from the same pellets, and had the desired shape and morphology and degree of cooking.

Example 2

In this example, stainless steel particles were heated inductively by applying electromagnetic radiation to a static particulate bed using an apparatus having the general structure of FIG. 3.

The particulate bed cooking medium comprised a 0.5 liter volume of solid stainless steel 440 particles. The particles had a particle diameter of 3 mm and a density of 4750 kg/m$^3$. These particles are available in commerce from Simply Bearings Ltd, of Leigh, Lancashire, UK.

The particulate bed was static. The stainless steel particles were heated inductively by applying electromagnetic radiation to the bed using the apparatus of FIG. 3.

At a nominal power setting of 2 kW, the temperature of the static bed was seen to rise from ambient (nominally 25° C.) to 200° C. in 80 seconds.

Additional Disclosure

Also disclosed herein are aspects of the present invention according to the following clauses:

1. A method of cooking a snack food, the method comprising the steps of:
   a. providing a bed comprising a plurality of particles, wherein the particles are composed of, comprise or consist of a material which is magnetic and/or electroconductive;
   b. heating the particles in the bed to form a cooking medium in the form of a heated bed of particles, wherein in step b the particles are heated at least partially by electromagnetic induction;
   c. providing a plurality of snack food precursor elements in the cooking medium thereby to cook the elements to form a plurality of cooked snack food pieces, wherein the heated particles transfer heat into the elements by thermal conduction; and
   d. separating the plurality of snack food pieces and the cooking medium.
2. A method according to clause 1 wherein the particles are inert and the particles do not react with or flavor the snack food product during the cooking method.
3. A method according to clause 2 wherein the particles have a density of from 250 to 7500 kg/m$^3$, optionally from 400 to 5000 kg/m$^3$.
4. A method according to any one of clauses 1 to 3 wherein the cooking medium has a bulk density of from 250 to 1000 kg/m$^3$.
5. A method according to clause 4 wherein the cooking medium of particles has a bulk density of from 400 to 800 kg/m$^3$.
6. A method according to any one of clauses 1 to 5 wherein the cooking medium has a bulk density which is lower than or equal to the density of the snack food precursor elements and/or the density of the cooked snack food pieces.

7. A method according to any one of clauses 1 to 5 wherein the cooking medium has a bulk density which is lower than the density of the snack food precursor elements and greater than the density of the cooked snack food pieces.
8. A method according to any one of clauses 1 to 7 wherein the cooking medium comprises a plurality of first particles and a plurality of second particles, wherein the first and second particles have respective first and second densities which are different.
9. A method according to clause 8 wherein the first density is higher than the second density and during cooking the first particles form a lower player and the second particles form an upper layer.
10. A method according to clause 8 or clause 9 wherein the density of the snack food precursor elements is between the first and second densities.
11. A method according to clause 10 wherein the density of the cooked snack food is lower than the first and second densities.
12. A method according to any one of clauses 1 to 11 wherein the particles are spherical or substantially spherical with an outer surface formed of a plurality of planar facets.
13. A method according to any one of clauses 1 to 12 wherein the particles have a particle size of from 40 μm to 5 mm.
14. A method according to clause 13 wherein the particles have a particle size of from 0.5 to 3 mm.
15. A method according to clause 13 or clause 14 wherein the particles have a particle size distribution wherein at least 50 wt % of the particles have a particle size within the range of from 0.5 to 2 mm.
16. A method according to clause 15 wherein at least 75 wt % of the particles have a particle size within the range of from 0.5 to 2 mm
17. A method according to any one of clauses 1 to 16 wherein the particles have a monomodal particle size distribution.
18. A method according to any one of clauses 1 to 16 wherein the particles have a multimodal particle size distribution, comprising a first fraction having a particle size defining a first particle size distribution and a second fraction having a particle size defining a second particle size distribution.
19. A method according to clause 18 wherein when the particles of the first fraction are closely packed, voids are formed between the closely packed particles and the particles of the second fraction are dimensioned to fit within the voids.
20. A method according to any one of clauses 1 to 19 wherein the particles are composed of, comprise or consist of a metal or a ceramic material.
21. A method according to clause 20 wherein the particles are composed of, comprise or consist of stainless steel, optionally a ferritic or austenitic stainless steel, further optionally stainless steel 304, 316, 440, 420 or 17-PH.
22. A method according to clause 20 or clause 21 wherein the particles are composed of, comprise or consist of at least one ceramic material selected from alumina, aluminum nitride, zirconia, titanium dioxide, silicon carbide, silicon nitride, silicon dioxide, boron nitride, boron carbide, yttrium oxide, or cordierite, or any mixture of two or more thereof.
23. A method according to any one of clauses 1 to 22 wherein the material which is magnetic and/or electro-conductive is a ferromagnetic material and/or a ferri-magnetic material and the method further comprises the step, after step d, of applying a magnetic force to the snack food pieces separated from the cooking medium to remove particles from the snack food pieces.
24. A method according to any one of clauses 1 to 23 wherein the material which is magnetic and/or electro-conductive is a ferromagnetic material and/or a ferri-magnetic material and the method further comprises the step, after step d, of applying a magnetic force to the snack food pieces separated from the cooking medium to detect the presence or absence of particles on the snack food pieces.
25. A method according to any one of clauses 1 to 24 wherein the particles are hollow.
26. A method according to clause 25 wherein the hollow particles have a wall which is composed of one or plural layers.
27. A method according to clause 26 wherein at least one layer comprises a magnetic or electrically conductive material.
28. A method according to any one of clauses 25 to 27 wherein the hollow particles have a wall thickness of at least 40 μm.
29. A method according to clause 28 wherein the wall thickness is from 10 to 40% of the particle size of the hollow particles.
30. A method according to any one of clauses 1 to 24 wherein the particles comprises a shell surrounding a central core.
31. A method according to clause 30 wherein the shell is composed of one or plural layers.
32. A method according to clause 30 or clause 31 wherein the shell has a wall thickness of at least 40 μm.
33. A method according to clause 32 wherein the wall thickness is from 10 to 40% of the particle size of the particles comprising a shell surrounding a central core.
34. A method according to any one of clauses 30 to 33 wherein the shell is composed of a metallic material and the core is composed of a ceramic material, or the shell is composed of a polymeric material and the core is composed of a metallic material.
35. A method according to any one of clauses 1 to 24 wherein the particles are solid with inclusions dispersed in a matrix.
36. A method according to clause 35 wherein the matrix is composed of a metallic material and the inclusions are composed of a ceramic material.
37. A method according to clause 35 wherein the matrix is composed of a first ceramic material and the inclusions are composed of a second ceramic material, wherein either or each of the first and second ceramic materials is a ferromagnetic material and/or a ferrimagnetic material.
38. A method according to any one of clauses 1 to 37 wherein the bed is a static bed.
39. A method according to any one of clauses 1 to 37 wherein the bed is a mobile bed, optionally which is tumbled, stirred or vibrated.
40. A method according to any one of clauses 1 to 37 or 39 wherein the bed is a mobile bed which has a Froude number of from 0.01 to 0.5, optionally from 0.1 to 0.3, further optionally from 0.15 to 0.25.
41. A method according to any one of clauses 1 to 40 wherein the cooking medium comprises or consists of the solid particles in a gas.

42. A method according to clause 41 wherein the gas is air, or a non-oxidative gas selected from nitrogen, argon, carbon dioxide, carbon monoxide, or any mixture thereof
43. A method according to clause 41 or clause 42 wherein the gas further comprises water vapour, optionally steam.
44. A method according to any one of clauses 41 to 43 wherein the gas is at an absolute pressure of from $20 \times 10^{-3}$ to 50 N/m$^2$.
45. A method according to any one of clauses 1 to 44 wherein the cooking medium is free of liquid.
46. A method according to any one of clauses 1 to 45 wherein the cooking medium is free of oil, fat or lipids.
47. A method according to any one of clauses 1 to 46 wherein the cooking medium has a depth of from 20 mm to 1 m, optionally from 20 mm to 500 mm, further optionally from 50 mm to 250 mm.
48. A method according to any one of clauses 1 to 47 wherein in step b the particles are heated at least partially by advection between the particles.
49. A method according to any one of clauses 1 to 48 wherein the snack food precursor elements are located within the particles after heating the particles.
50. A method according to any one of clauses 1 to 49 wherein the snack food precursor elements are located within the particles prior to heating the particles.
51. A method according to any one of clauses 1 to 50 which is a batch cooking method, in which a batch of the snack food precursor elements is located within the bed of particles and in step d the cooked snack food pieces and the cooking medium are separated.
52. A method according to clause 51 wherein the batch is located within the bed of particles at room temperature (20-30° C.) and then the bed and batch are heated.
53. A method according to clause 51 wherein the bed is preheated to a desired temperature prior to location of the batch therein.
54. A method according to any one of clauses 1 to 53 wherein in step d the cooked snack food pieces and the cooking medium are separated by at least one of sieving, size exclusion, density difference, vibration, gravity or magnetic separation.
55. A method according to any one of clauses 1 to 50 which is a continuous cooking method, in which a supply of the snack food precursor elements is continuously or intermittently charged into the bed of particles which has been preheated to a desired temperature, in step d a mixture of the particles and cooked snack food pieces is continuously or intermittently removed from the bed, and after step d the particles and the cooked snack food pieces are separated and the separated particles are recycled back to the bed.
56. A method according to clause 55 wherein the supply of the snack food precursor elements is continuously charged into the bed of particles and in step d the mixture of the particles and cooked snack food pieces is continuously removed from the bed.
57. A method according to any one of clauses 1 to 56 wherein the snack food precursor elements comprise starch-containing pellets and when the pellets are cooked to form the cooked snack food pieces the pellets expand and reduce in density.
58. A method according to any one of clauses 1 to 57 wherein the snack food precursor elements are coated with a topical seasoning prior to being provided in the cooking medium.
59. A method according to any one of clauses 1 to 58 wherein a topical seasoning is introduced into the bed of particles prior heating the bed of particles.
60. A method according to clause 59 wherein the topical seasoning is introduced into the bed prior of particles prior to step c of providing a plurality of snack food precursor elements in the cooking medium.
61. A method according to any one of clauses 58 to 60 wherein the topical seasoning comprises an oil-free composition.
62. A method according to any one of clauses 1 to 61 wherein the cooked snack food pieces are coated with a topical seasoning after separation from the cooking medium.
63. A method according to clause 62 wherein the topical seasoning comprises a topical oil a topical oil-in-water emulsion, or a topical water-in-oil emulsion.
64. A method according to clause 63 wherein the topical seasoning coating comprises from 6 to 8 wt % of the total weight of the topically seasoned cooked snack food pieces.
65. A method according to any one of clauses 1 to 64 wherein the snack food precursor element has a mass of from 0.1 to 10 g.
66. A method according to any one of clauses 1 to 65 wherein the snack food precursor element has a water content of from 5 to 85 wt % based on the total weight of the snack food precursor element.
67. A method according to any one of clauses 1 to 66 wherein the cooking medium is heated to a temperature of from 35 to 300° C.
68. A method according to clause 67 wherein the cooking medium is heated to a temperature of from 100 to 300° C.
69. A method according to clause 68 wherein the cooking medium is heated to a temperature of from 150 to 300° C.
70. A method according to any one of clauses 1 to 69 wherein the snack food precursor elements are provided in the cooking medium to form the cooked snack food pieces for a cooking period of from 2 to 600 seconds.
71. A method according to clause 70 wherein the cooking period is from 5 to 180 seconds, optionally from 5 to 60 seconds, further optionally from 5 to 30 seconds.
72. A method according to any one of clauses 1 to 71 further comprising the step, before step c, of pre-treating a surface of the snack food precursor elements to lower a moisture content of the surface.
73. A method according to clause 72 wherein the pre-treatment comprises impinging air onto the surface of the snack food precursor elements.
74. A method according to clause 73 wherein the impinging air is at a temperature of from 20 to 100° C.

Various other modifications to the present invention will be readily apparent to those skilled in the art.

What is claimed is:

1. A method of cooking expandable snack food precursor pieces, the method comprising the steps of:
   a. providing a bed comprising a plurality of particles, wherein the particles comprise a material which is magnetic or electroconductive or both;
   b. heating the particles in the bed to form a cooking medium in the form of a heated bed of mobile particles, a portion of the particles of the bed having a density higher than uncooked snack food precursor pieces to be cooked in the bed, and another portion of the particles of the bed having a density lower than or equal to expanded cooked snack food pieces, wherein the heating is at least partially by electromagnetic induction, and the mobile particles have a Froude number in the range from 0.01 to 0.5;

c. providing a plurality of expandable snack food precursor pieces in the cooking medium thereby to cook the expandable snack food precursor pieces to form a plurality of expanded cooked snack food pieces, wherein the heated particles transfer heat into the expandable snack food precursor pieces by thermal conduction; and d. separating the plurality of expanded cooked snack food pieces from the cooking medium.

2. The method according to claim 1, wherein the particles are inert and the particles do not react with or flavor the expandable snack food precursor pieces during the cooking method.

3. The method according to claim 2 wherein the particles have a density of from 250 to 7500 kg/m$^3$.

4. The method according to claim 1, wherein the cooking medium has a bulk density of from 250 to 1000 kg/m$^3$.

5. The method according to claim 1, wherein the cooking medium has a bulk density which is lower than or equal to the density of the uncooked snack food precursor pieces and/or the density of the expanded cooked snack food pieces.

6. The method according to claim 1, wherein the particles are spherical or substantially spherical.

7. The method according to claim 1, wherein the particles have a particle size of from 40 μm to 5 mm.

8. The method according to claim 1, wherein the particles comprise a metal or a ceramic material.

9. The method according to claim 8, wherein the particles comprise stainless steel.

10. The method according to claim 8, wherein the particles comprise at least one ceramic material selected from the group consisting of alumina, aluminum nitride, zirconia, titanium dioxide, silicon carbide, silicon nitride, silicon dioxide, boron nitride, boron carbide, yttrium oxide, or cordierite, or mixtures thereof.

11. The method according to claim 1, wherein the material which is magnetic and/or electroconductive is a ferromagnetic material and/or a ferrimagnetic material and the method further comprises a step, after step d, of applying a magnetic force to the expanded cooked snack food pieces separated from the cooking medium to remove the particles from the expanded cooked snack food pieces.

12. The method according to claim 1, wherein the material which is magnetic and/or electroconductive is a ferromagnetic material and/or a ferrimagnetic material and the method further comprises a step, after step d, of applying a magnetic force to the expanded cooked snack food pieces separated from the cooking medium to detect the presence or absence of the particles on the expanded cooked snack food pieces.

13. The method according to claim 1, wherein the particles are hollow, wherein the particles comprises a shell surrounding a central core or wherein the particles are solid with inclusions dispersed in a matrix.

14. The method according to claim 13, wherein the matrix is composed of a metallic material and the inclusions are composed of a ceramic material or wherein the matrix is composed of a first ceramic material and the inclusions are composed of a second ceramic material, wherein either or each of the first and second ceramic materials is a ferromagnetic material and/or a ferrimagnetic material.

15. The method according to claim 1, wherein the bed is a mobile bed, which is tumbled, stirred or vibrated.

16. The method according to claim 1, wherein the cooking medium is free of liquid.

17. The method according to claim 1, wherein the cooking medium is free of oil, fat or lipids.

18. The method according to claim 1, wherein the cooking medium has a depth of from 20 mm to 1 m.

19. The method according to claim 1, wherein, in step b, the particles are heated at least partially by advection between the particles.

20. The method according to claim 1, wherein, in step d, the expanded cooked snack food pieces and the cooking medium are separated by at least one of processes of sieving, size exclusion, density difference, vibration, and separation by gravity or magnetism.

21. The method according to claim 1, wherein the expandable snack food precursor pieces comprise starch-containing pellets and, when the pellets are cooked to form the expanded cooked snack food pieces, the pellets expand and reduce in density.

22. The method according to claim 1, wherein the cooking medium is heated to a temperature of from 35 to 300° C.

23. The method according to claim 1, wherein the expandable snack food precursor pieces are provided in the cooking medium to form the expanded cooked snack food pieces for a cooking period of from 2 to 600 seconds.

* * * * *